Feb. 28, 1967 R. L. HORST 3,307,187
OMNIAZIMUTHAL REFLECTORS
Filed March 11, 1966

INVENTOR
Robert L. Horst

BY *Hall, Pollock & Vande Sande*

ATTORNEYS

United States Patent Office 3,307,187
Patented Feb. 28, 1967

3,307,187
OMNIAZIMUTHAL REFLECTORS
Robert L. Horst, Lancaster, Pa., assignor to Armstrong Cork Company, Lancaster, Pa., a corporation of Pennsylvania
Filed Mar. 11, 1966, Ser. No. 533,473
10 Claims. (Cl. 343—18)

The present invention relates to improved cylindrical reflector structures for use at high radio frequencies, particularly at frequencies in the microwave portion of the spectrum; and is more particularly concerned with such reflector structures employing a Luneberg lens associated with one or more peripheral reflective surfaces so arranged as to give substantially omnidirectional (360°) coverage, and a higher efficiency of energy turnabout, than has been the case with reflectors suggested heretofore.

Various forms of lens reflectors utilizing a mass of dielectric material having a dielectric gradient therein, and associated with a reflective surface, have been suggested heretofore. In some cases, these prior lens reflectors involve a structure adapted to respond to incident energy coming from a particular direction only; and if omniazimuthal coverage is desired, it is necessary to effect a scanning operation involving physical movement of the lens reflector, e.g., about a central axis. In an effort to avoid the need for physically moving the lens reflector to achieve omniazimuthal coverage, alternative arrangements have been suggested. However, echoing, geometry and cost requirements often dictate the use of cylinder shaped reflectors over these other types of omniazimuthal reflectors, e.g., spherical lenses with an equatorial reflector, clusters of spherical (cap) reflectors, clusters of corner reflectors, etc. Omniazimuthal cylindrical structures such as have been suggested heretofore, however, have not been particularly satisfactory.

By way of example, one technique suggested heretofore, for achieving omniazimuthal coverage in a cylindrical structure, has involved the fabrication of an Eaton lens which, due to its particular dielectric gradient, is designed to effect a 180° turnabout of incident energy within the lens structure and without need of a separate reflective surface. While, in theory, an Eaton lens of the type mentioned should have a relatively high efficiency of return, it has been found in practice that actual constructions of the Eaton-type exhibit a return of less than 10% of the incident energy. This efficiency of return is, in practice, so low that Eaton-type lenses have not found any wide usage in actual practice. Other prior cylindrical structures, e.g., metal cylinders, have been found to exhibit still other disadvantages.

The present invention, recognizing the deficiencies of such structures suggested heretofore, is accordingly concerned with the provision of a cylindrical lens reflector adapted to exhibit a higher efficiency of energy return for a given vertical beam angle, or an increased vertical beam angle for a given energy return, than has been the case heretofore, and adapted, moreover, to achieve substantially omniazimuthal coverage without involving the expense and difficulty of fabricating more complex structures, such as a spherical lens structure.

It is, accordingly, an object of the present invention to provide an improved cylindrical lens reflector adapted to give omniazimuthal coverage.

Another object of the present invention resides in the provision of a lens reflector structure which is simpler and less expensive to fabricate and utilize, and which gives a higher efficiency of return for a given reflector size than has been the case heretofore.

A still further object of the present invention resides in the provision of an improved lens reflector structure comprising a two-dimensionally graded dielectric lens associated with a reflector strip structure spaced about the outside of the lens at different levels.

Another object of the present invention resides in the provision of a lens reflector structure adapted to provide omniazimuthal coverage and exhibitiing a minimum of aperture blocking effects.

In providing for the foregoing objects and advantages, the present invention contemplates the provision of a lens reflector taking the form of a two-dimensionally graded lens (e.g., a cylindrical Luneberg lens) fabricated as either a single monolith or as a plurality of two-dimensionally graded lenses stacked upon one another. Such a two-dimensionally graded lens structure can be prepared by various techniques suggested heretofore, including so-called step construction techniques wherein a plurality of blocks of material, concentric cylinders, or shells exhibiting proper individual dielectric constants are assembled to effect a stepwise approximation of a theoretical refractive index gradation, e.g., a Luneberg gradation. In accordance with a preferred technique, however, the lens portion of the lens reflector structure is fabricated by a technique of the type described in my prior co-pending application Serial No. 217,751, filed August 17, 1962, now Patent No. 3,256,373, for "Method of Forming a Cylindrical Dielectric Lens." The use of such a technique results in the fabrication of a cylindrical mass of dielectric material having a substantially continuous variation in dielectric constant in radial directions; and such a lens accordingly comes closer to approximating the theoretical gradation contemplated by Luneberg, than is possible with step index or step construction techniques.

The technique of my prior application includes the steps of cross-feeding a granular dielectric material of near-unity dielectric constant with a granular dielectric material of higher dielectric constant. This cross-feeding is effected along the radius of a substantially cylindrical charge box, with varying amounts of the materials being mixed with one another at different points along said radius. The charge box is rotated during the cross-feeding steps to build up a circularly symmetrical mass of the cross-fed granular material; and this circularly symmetrical mass of material can then be fused into a homogeneous substantially cylindrical mass of two-dimensionally graded dielectric material. The materials employed can comprise either natural or artificial dielectric materials; and when the material constitutes an artificial dielectric, it preferably comprises needle-shaped aluminum slivers distributed with varying concentration (in accordance with the desired dielectric gradation) through a low-loss polystyrene foam supporting matrix. If the charge box available for collection of the cross-fed materials is sufficiently deep, the technique described is capable of directly achieving a unitary monolithic lens structure upon which various reflective surfaces can be mounted; and such a single monolithic lens structure represents a preferred embodiment of the present invention. If, however, it is not possible to get a single monolith of desired height by reason of limitations in the available fabrication equipment, a plurality of cylindrical disks can be fabricated (e.g. each disk being about 10 wavelengths or greater in diameter, and about 2 wavelengths or greater in thickness); whereafter a plurality of such disks may be stacked one upon the other (e.g. three such disks can be stacked) to achieve a final lens structure of desired dimensions.

Once the cylindrical lens is fabricated, a curved reflector structure is mounted upon the outer periphery of the cylinder in such a manner as to provide reflective segments at different levels. In a preferred embodiment of the invention, the reflector structure comprises a continuous strip of reflective material (e.g. conductive tape, metal foil, or conductive paint) disposed in a helical configuration about the exterior of the lens. Such a helical configuration achieves reflective strip surfaces at different levels about the exterior of the lens to produce omniazimuthal coverage, as will be described.

In accordance with another embodiment of the invention, a plurality of reflector strips having appropriate arcuate extents can be mounted in staggered substantially non-overlapping relation to one another on the exterior of said lens to produce a piece-wise approximation of the aforementioned continuous reflector strip. By proper choice of the dimensions and disposition of such arcuate reflector strips, the final lens reflector can achieve omniazimuthal coverage with a minimum of aperture blocking. For example, four spaced 90° reflector strips may be disposed in substantially non-overlapping relation to one another at different levels along the exterior of the lens; or it is possible to utilize an even larger number of staggered arcuate reflector strips extending over a lesser arc each. I have found, however, that three 120° reflector strips produce excellent omniazimuthal coverage and a substantially constant reflection response; and while, in theory, the use of three 120° reflectors would seem to provide some fall-off due to aperture blocking between adjacent reflector strips at the extreme points of the reflectors, I have found that, in practice, the fall-off is not recognizable, and the resultant response is still substantially constant. Therefore, as a practical matter, three 120° reflectors provide a constant response in the most economical structure.

The foregoing objects, advantages, construction and operation of the present invention will become more readily apparent from the following description and the accompanying drawings in which.

Figure 1:
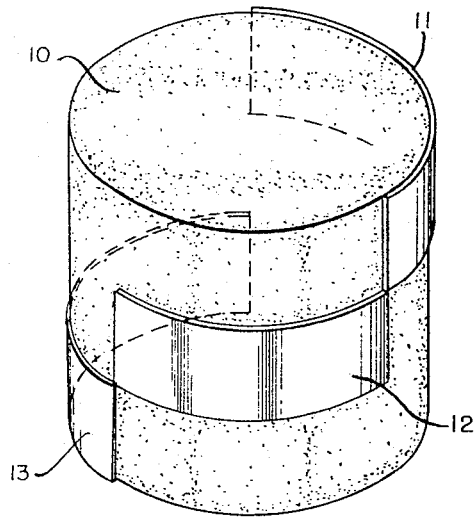
FIGURE 1 is a perspective view of a lens reflector constructed in accordance with one embodiment of the present invention.
Figure 2:
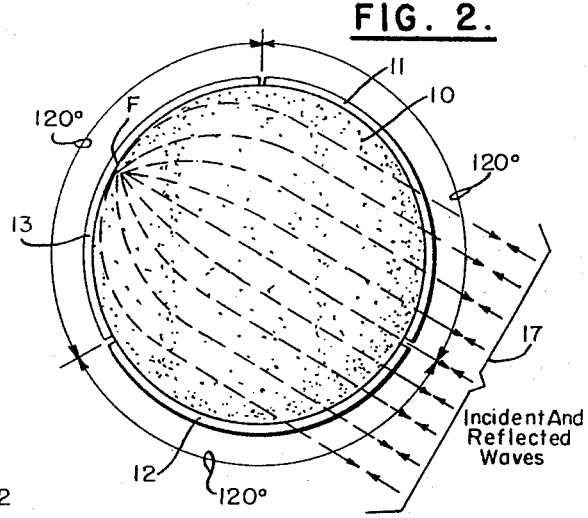
FIGURE 2 is a plan view of the lens reflector shown in FIGURE 1.

Referring now to FIGURES 1 and 2, it will be seen that a lens reflector constructed in accordance with the present invention may comprise a cylindrical lens 10 having a two-dimensional dielectric gradation, i.e. a Luneberg gradation, in radial directions. The lens 10 may constitute either a natural or artificial dielectric material, and it can be fabricated by any of the techniques described heretofore although, preferably, the said lens 10 exhibits a continuous gradation due to the use of a fabrication technique of the type described in my prior co-pending application Serial No. 217,751, identified previously. The lens 10 shown in FIGURE 1 is illustrated as a single monolithic structure which comprises a preferred embodiment of the present invention; but the said lens 10 can also be fabricated as a plurality of two-dimensionally graded lenses or disks stacked one upon the other. The lens 10 is associated with a reflector structure comprising a plurality of reflector strips 11, 12, and 13, spaced around the outside two-dimensionally graded lens 10 at different vertical levels; and the entire lens reflector structure may, if desired, be encased in an appropriate shell of protective material, e.g. fiber glass.

Figure 4:
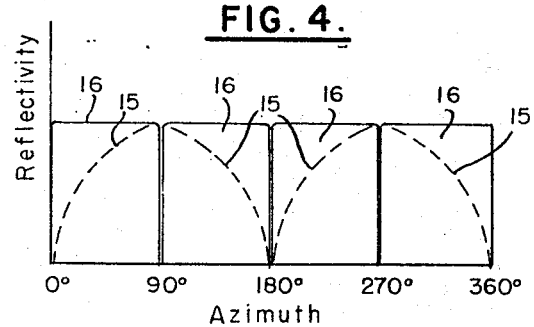
FIGURE 4 constitutes a set of curves illustrating certain reflectivity characteristics of lens reflectors of the types involved in the present invention.

In theory, N reflector strips could be employed, each extending over an arc of 360°/N. If two reflector strips, each extending over an arc of 180° are employed, with said two reflector strips being positioned in substantially non-overlapping relation to one another at different levels on the lens exterior, aperture blocking tends to occur adjacent the extremities of the reflector strips i.e. energy tending to enter or leave the lens in the region of the reflector srip extremities experiences a very serious fall-off in return level. This consideration is shown in FIGURE 4 wherein the broken line 15 illustrates the reflectivity response of such a two-strip structure for different azimuths; and it will be seen that while a maximum response is achieved at the 90° and 270° points corresponding to the central regions of the assumed 180° reflector strips, the reflectivity response falls off on either side of these central points, and is substantially zero at the 0°, 180°, and 360° points corresponding to the extreme edges of the assumed 180° reflector strips.

A flat response for a structure of the type shown in FIGURE 1 may be achieved by using four tier-type or vertically spaced reflectors extending in substantially non-overlapping relation to one another over arcs of substantially 90° each. The response achieved by such a four-strip arrangement is shown by the curves 16 in FIGURE 4. It will be seen that each reflector surface produces a substantially square wave response, and the tops of the curves 16 form a substantially straight line throughout the 360° of azimuth with no interruptions in the response at the extreme points of the non-overlapping reflector strips.

The arrangement which is preferred for the embodiment of the present invention illustrated in FIGURE 1 is one wherein three reflector strips are employed, each extending over an arc of substantially 120°. Such a structure is more desirable when efficiency (relative to the overall lens aperture area) is considered along with the requirement for a flat response. While three 120° reflectors, e.g. reflectors such as 11, 12 and 13, would, in theory, provide some falloff (due to aperture blocking) between adjacent reflectors at their extreme points, as a practical matter it has been found that the falloff is not recognizable, and the response is still substantially flat, corresponding for example to the tops of the curves 16 shown in FIGURE 4.

It will be understood that, due to the Luneberg gradation employed in cylindrical lens 10, incident waves passing through an exterior surface of the lens 10 are brought to a focus at a point adjacent to the lens periphery diametrically opposed from the region of entry. This consideration is shown in FIGURE 2, with one such focal point being designated F for the assumed plane wave of incident energy 17. The method by which the lens 10 causes refraction of incident energy will be understood by those skilled in the art; and due to the fact that the energy is brought to a focus adjacent one of the reflector strips (e.g. the strip 13 shown in FIGURE 2) the focused energy is reflected from said reflector strip and emerges once more from the lens reflector as a plane wave. Due to the fact, moreover, that some exterior portion of the lens 10 is always exposed (that is, not covered by a reflector strip), energy may enter the lens from any point in azimuth; and such entering energy will be brought to a focus and thereafter reflected, in part, by a reflector strip positioned at some level along the lens opposite the point of entering energy.

In the arrangement of FIGURE 1, the reflector strips (which may comprise one of the conductive materials discussed previously) are assumed not only to extend over arcs of 120°, but are also assumed to extend through individual vertical dimensions corresponding to substantially ⅓ the height of the overall lens 10. For example, if the overall height of lens 10 is nine inches (either as a single lens structure, or as a result of stacking three 3-inch disks upon one another) each of the strips 11, 12, and 13 would exhibit a dimension along the axis of the lens substantially equal to three inches. As a result of this consideration, only one-third of the lens volume is operative at any particular time to produce reflected energy. While the efficiency is reduced relative to that of an equally efficient structure of the same overall dimensions, the vertical beam angle is increased. Further, because of low efficiency factors relating to other known types of cylinder reflectors, the actual backscatter can in practice be superior to that of reflectors of the same overall dimensions.

More particularly, by employing techniques and materials of the types described in my prior co-pending application Serial No. 217,751, identified earlier, a single lens disk having a single 120° reflector thereon has been found to have an efficiency of return of substantially 90 percent i.e. 90 percent of the incident energy can be returned toward the source. When a cylindrical mass of dielectric material is associated with three 120° staggered reflectors of the type shown in FIGURE 1, the fact that only one-third of the lens volume is operative at any particular time reduces the efficiency of the overall structure. In practice, it has been found, however, that for a given cylinder size, the structure shown in FIGURE 1 actually achieves an increase in efficiency over cylindrical reflectors suggested heretofore for similar purposes. Moreover, the vertical beamwidth (vertical viewing angle) is increased threefold due to the decreased height of the reflecting surface at any given instance. As a result, the vertical viewing angle, i.e. the angle about which the viewing device can move in directions perpendicular to the azimuthal viewing plane, has been broadened and omniazimuthal response has been achieved without sacrifice of backscatter response relative to known cylinder reflector types such as metal cylinders and Eaton lenses.

Figure 3:
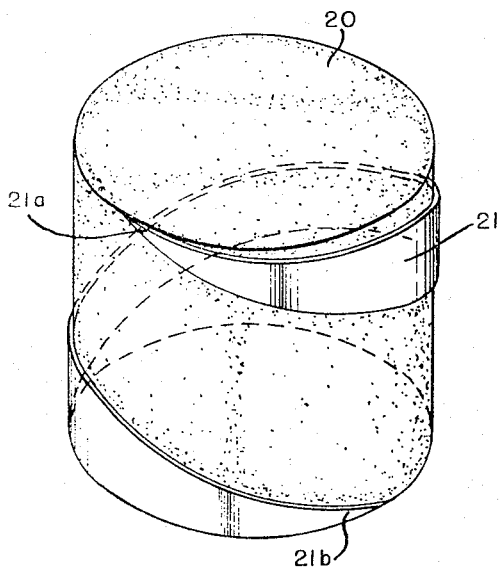
FIGURE 3 is a perspective view of another embodiment of the present invention.

A second embodiment of the invention, actually comprising a preferred embodiment of the invention, and operating substantially in the manner already described in reference to FIGURES 1 and 2, is shown in FIGURE 3. In this second embodiment, a lens structure 20 fabricated in a manner entirely similar to that described previously for lens 10, is associated with a continuous reflective strip 21 extending in a spiral or helical configuration about the exterior of the lens. As illustrated in FIGURE 3, the free ends 21a and 21b of strip 21 are tapered, and overlap one another, so that the total dimension of reflective material is the same at any azimuth. The reflector strip 21 may be thought of as a series of adjacent reflective portions of differential arc length disposed at different vertical levels about the lens exterior. Incident energy is brought to a focus by the lens 20 and thereafter reflected by a portion of strip 21 in much the manner already described in reference to FIGURE 2.

While I have thus described preferred embodiments of the present invention, many variations will be suggested to those skilled in the art; and it must therefore be understood that the foregoing description is meant to be illustrative only and is not limitative of my invention. All such variations and modifications as are in accord with the principles described are meant to fall within the scope of the appended claims.

Having thus described my invention, I claim:

1. A radio frequency lens reflector comprising a substantially cylindrical mass of dielectric material exhibiting a dielectric gradient in radial directions, and curved reflector strip means extending along the outer peripheral surface of said cylindrical mass in directions concentric with the central axis of said cylindrical mass, said reflector strip means having a dimension in directions parallel to the axis of said cylindrical mass comprising a fraction of the axial distance between the uppermost and lowermost faces of said cylindrical mass, said reflector strip means including arcuate sections disposed at different axial levels relative to the axis of said cylindrical mass.

2. The lens reflector of claim 1 wherein said reflector strip means comprises three arcuate sections each of which extends over an arc of substantially 120° about the axis of said mass, said three arcuate sections being positioned about said mass in staggered substantially non-overlapping relation to one another at said different axial levels respectively.

3. The lens reflector of claim 2 wherein each of said arcuate sections has an axial dimension equal to substantially one-third the axial distance between said uppermost and lowermost faces of said mass.

4. The lens reflector of claim 1 wherein said cylindrical mass exhibits a Luneberg gradation in radial directions.

5. The leans reflector of claim 4 wherein said mass comprises an artificial dielectric material including metallic particles supported in a dielectric matrix, the concentration of said metallic particles in said matrix varying smoothly in accordance with said Luneberg gradation in radial directions from the central axis of said cylindrical mass to the outer peripheral surface of said mass.

6. The lens reflector of claim 1 wherein said reflector strip means extends in a helical configuration along the outer surface of said mass.

7. The lens reflector of claim 6 wherein said helical reflector strip means includes a pair of tapered free ends positioned at different axial levels along said peripheral surface and disposed in overlapping axial relation to one another.

8. The lens reflector of claim 1 wherein said cylindrical mass comprises a plurality of cylindrical disks stacked one upon the other.

9. The lens reflector of claim 1 wherein said cylindrical mass comprises a monolith.

10. The lens structure of claim 1 wherein said reflector strip means comprises a conductive metallic foil.

No references cited.

CHESTER L. JUSTUS, *Primary Examiner.*

D. C. KAUFMAN, *Assistant Examiner.*